(12) United States Patent
Schacht Hernandez et al.

(10) Patent No.: US 11,760,944 B2
(45) Date of Patent: Sep. 19, 2023

(54) HYDROPROCESSING OF HEAVY CRUDES BY CATALYSTS IN HOMOGENOUS PHASE

(71) Applicant: INSTITUTO MEXICANO DEL PETROLEO, Mexico City (MX)

(72) Inventors: Persi Schacht Hernandez, Mexico City (MX); Jose Manuel Dominguez Esquivel, Mexico City (MX); Benjamin Portales Martinez, Mexico City (MX); Ismael Soto Escalante, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 468 days.

(21) Appl. No.: 16/932,326

(22) Filed: Jul. 17, 2020

(65) Prior Publication Data

US 2021/0017457 A1    Jan. 21, 2021

(30) Foreign Application Priority Data

Jul. 19, 2019 (MX) .................... MX/a/2019/008622

(51) Int. Cl.
*C10G 45/50* (2006.01)
*C10G 45/08* (2006.01)
(Continued)

(52) U.S. Cl.
CPC ............. *C10G 45/50* (2013.01); *C10G 45/08* (2013.01); *C10G 47/12* (2013.01); *E21B 43/16* (2013.01); *B01J 23/755* (2013.01); *C10G 2300/107* (2013.01); *C10G 2300/1077* (2013.01); *C10G 2300/302* (2013.01); *C10G 2300/308* (2013.01);
(Continued)

(58) Field of Classification Search
CPC ........ B01J 23/74; B01J 23/745; B01J 23/755; B01J 23/75; B01J 23/70; B01J 23/72; B01J 23/16; B01J 23/28; B01J 23/30
See application file for complete search history.

(56) References Cited

U.S. PATENT DOCUMENTS 4,136,013 A    1/1979 Moll et al.
4,486,293 A    12/1984 Garg
(Continued)

FOREIGN PATENT DOCUMENTS

WO    2005/005581 A1    1/2005
WO    2009/011559 A1    1/2009
(Continued)

*Primary Examiner* — Randy Boyer
*Assistant Examiner* — Juan C Valencia
(74) *Attorney, Agent, or Firm* — FisherBroyles, LLP; Jason P. Mueller

(57) ABSTRACT

This disclosure relates to a procedure, which through the application of a catalyst in homogeneous phase, allows the transformation of heavy hydrocarbons (vacuum residue, atmospheric residue, heavy and extra-heavy crudes) into hydrocarbons of lower molecular weight, characterized because after its application, the hydrocarbons obtain greater API gravity, lower kinematic viscosity and different composition by hydrocarbon families (SARA) that increases the proportion of saturated and aromatic resins and asphalts. The sulphur and nitrogen content is also reduced, resulting in higher yields to high commercial value distillates and a lighter product as compared to the original crude.

14 Claims, 1 Drawing Sheet

(51) Int. Cl.
*C10G 47/12* (2006.01)
*B01J 23/755* (2006.01)
*E21B 43/16* (2006.01)

(52) U.S. Cl.
CPC ............... *C10G 2300/4037* (2013.01); *C10G 2300/703* (2013.01); *C10G 2300/708* (2013.01); *C10G 2400/02* (2013.01); *C10G 2400/04* (2013.01); *C10G 2400/06* (2013.01)

(56) References Cited

U.S. PATENT DOCUMENTS

| | | |
|---|---|---|
| 5,168,088 A | 12/1992 | Utz et al. |
| 5,731,101 A | 3/1998 | Sherif et al. |
| 6,139,723 A | 10/2000 | Pelrine et al. |
| 6,969,693 B2 | 11/2005 | Sauvage et al. |
| 7,001,504 B2 | 2/2006 | Schoonover |
| 8,257,579 B2 | 9/2012 | Barrero et al. |
| 2010/0010282 A1 | 1/2010 | Acosta Estrada |
| 2010/0193401 A1* | 8/2010 | Nares Ochoa ......... C10G 45/62 502/316 |
| 2012/0172207 A1* | 7/2012 | Nguyen ............... B01J 23/8873 502/167 |

FOREIGN PATENT DOCUMENTS

| | | | |
|---|---|---|---|
| WO | 2014/068390 A1 | 5/2014 | |
| WO | WO-2017094030 A2 * | 6/2017 | ............. B01J 21/12 |
| WO | 2018/064990 A1 | 4/2018 | |
| WO | WO-2019077619 A1 * | 4/2019 | ............ B01J 23/755 |

* cited by examiner

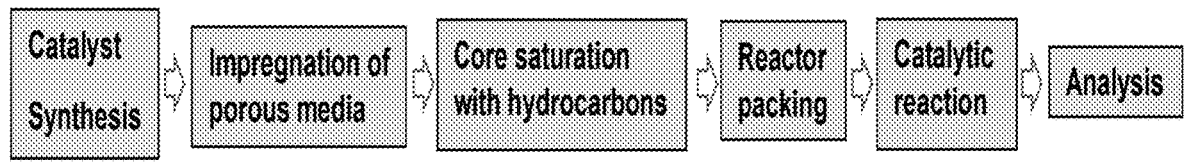

HYDROPROCESSING OF HEAVY CRUDES BY CATALYSTS IN HOMOGENOUS PHASE

CROSS-REFERENCE TO RELATED APPLICATIONS

This application claims priority to Mexican Patent Application No MX/a/2019/008622, filed Jul. 19, 2019, the entire disclosure of which is hereby incorporated by reference herein.

TECHNICAL FIELD

This disclosure relates to the field of technologies for the improvement of petroleum crude oils, through changes in their physical and chemical properties, for example: increased gravity API, decrease in viscosity, increase in the proportion of saturated and aromatic, the increase of distilled fractions (gasoline, diesel and heavy gasoil) and decrease in the amount of long-chain paraffin resins, as well as asphaltenes, sulfur, nitrogen, etc.

BACKGROUND OF INVENTION

The oil industry requires the development of more efficient secondary recovery processes and improvement methods, by using alternative methods of exploitation to increase the relative production factor of reservoirs. In addition, the handling and transport of heavy crude oils to refining facilities are relevant aspects for the production of fuels. The heavy oil reservoirs are difficult to exploit due to high flow resistance (high viscosity) and these fluids present a lesser yield of distillates (<538° C.).

Some technologies focused on improving the quality of heavy and extra-heavy crude oils within the reservoir, with the purpose of increasing the recovery factor, i.e., vapor injection in situ (ISSI), simulated cyclic injection of vapor (CSS), Aquatermolysis (AT), Steam Assisted Gravity Drainage (SAGD), In Situ Combustion (ISC) by air injection, and In Situ Combustion through intelligent wells (THAI: Toe-to-Heel-Air-Injection), and other recovery methods in situ that involve the use of heterogeneous catalysts (CAPRI: Catalytic Upgrading Process In Situ) and their combinations like THAI-CAPRI.

Conventional crude oils ranging between 20 to 32° API are extracted from the reservoir primarily by natural fluency aided by artificial production systems, but secondary recovery methods may lead to further recovery. However, heavy crude oils that have densities between 10 and 15° API present particular problems for its extraction by conventional techniques, which makes it that alternative extraction schemes are applied to significantly increase production and recovery factors with the required quality.

Current enhanced oil recovery technologies have limitations for extracting heavy oils, i.e., Steam Assisted Gravity Drainage and Cyclic Steam Injection can be applied only at medium depths around 1,000 m. In turn the air injection technologies present a high risk because the use of air injection that provokes the ignition and propagation of a combustion front from the injector to the producer wells, respectively, with some potential difficulties along the way, i.e., explosion risk, deviation of the combustion front, or flame extinction could occur before making contact with hydrocarbons.

Other methods like THAI (Toe-to-Heel-Air-Injection)/CAPRI (Catalytic upgrading-Process-In Situ) technologies use a vertical injection well combined with a horizontal production well, and use feeding air that is pumped down through a vertical well. When air is pumped, the combustion chamber grows and high temperatures develop inside the reservoir. This heat influx reduces the viscosity of heavy crude oil and causes it to flow further within the horizontal production well. The gas produced from combustion brings the crude to the surface.

The THAI process combines a special vertical and horizontal well configuration with on-site combustion. CAPRI is simply THAI plus a catalyst that is added to around the production well. The idea behind the THAI/CAPRI process is to initiate an underground flame and this causes bitumen or heavy crude flow, at the same time, to improve some properties of crude oil in situ.

In contrast to the above technologies, the present disclosure refers to a procedure for the improvement of heavy and extra-heavy crude oils by applying homogeneous phase catalysts with hydrocarbon and the procedures used during its application, so that the physical and chemical properties of the hydrocarbon are improved, as the API seriousness is increased, decreasing its kinematic viscosity, with a change in composition by hydrocarbon families (SARA), decreasing their sulphur and nitrogen content. Simulated distillation indicates the presence of distillates of higher commercial value, (petrol and diesel) with a lower average molecular weight.

Other crude oil enhancement technologies are contained in the following patents:

Patent application WO2005005581A1 refers to a process for the catalytic hydrotreating of heavy hydrocarbons with high in metals content and asphaltenes, which operates at low pressure, in combination with a type of reactor and feed loading, which together limit the formation of sediments and sludge in the product, thus obtaining a hydrocarbon with improved properties, with a low level of contaminants, higher gravity API and distillates, which falls within the intervals commonly reported in typical feed loads for refining schemes.

Patent application WO2014068390A1 concerns nanoparticulate surfactant formulations that improve the transport of heavy hydrocarbons. The formulation comprises a nanoparticulate surfactant selected from a group consisting of hydrophilic silica nanoparticles, with metallic character or mixtures thereof, plus an ion liquid (IL), non-ionic or non-ionic liquid surfactant.

Patent application WO2009011559A1 reports an ion liquid catalyst for the improvement of heavy and extra-heavy crudes through hydrocracking type reactions and hydrogenation of asphaltenes and resins, which are promoted by Mo and Fe-based ion liquid catalysts. These catalysts are highly miscible in the homogeneous phase within crude oil.

Patent application US20100010282A1 refers to a new procedure either to increase or reduce the viscosity of light or heavy hydrocarbons, respectively, by means of dopamine mixtures, a compound that is combined with other substances, to modify flow properties and increase the electrical load of mixtures and solutions as well as the dissolution of insoluble compounds in water or in aqueous solvents. Some mixtures are designed to modify the proton mobility, thus, the invention showed banana plant juice that contains dopamine and other compounds such as quinones, carotenes and terpenes are responsible for the observed effects, especially for electrical properties and dissolution of metals and its metallic compounds.

U.S. Pat. No. 8,257,579B2 reports a process for dewatering and removing asphaltenes from heavy and extra-heavy crude oils online. The process is applied at the well mouth with pressures of 414 to 689 KPa and at a temperatures range between 60 and 100° C., which includes two stages, one dewatering and one of embezzlement. In the first case the addition of solvent is performed, thus free water is removed, plus heating, use of emulsion-breaking additives and settling for water removal form emulsion. In the second stage the asphaltenes are extracted, which comprise the use of low-effort in-line contactors or mixers, a specific design and use of a sedimentator that contains specific internal components for phase separation. The recovered solvent is recirculated to the process, while the separation of crude oil improves, and asphaltenes are re-arranged as fuels for electric cogeneration, which self-supplies energy requirements for the production and improvement process.

Patent document WO2018/064990 relates a formulation and process of preparation of catalytic materials for hydrocracking processes (HCK) of heavy crude fractions in dispersed bed reactors, from deactivated catalysts in fixed bed hydrotreatment units (HDTs). For preparation, catalyst precursors must undergo a process comprising the following unit operations consecutively: liquid-liquid extraction washing, grinding, drying, calcining and activation by means of elemental sulphur treatment. The present invention is also related to a hydrocracking process in dispersed bed that improves the performance of prepared catalysts.

U.S. Pat. No. 7,001,504 refers to the use of ion liquids for the partial conversion of sulfur compounds to sulfoxides or sulfones to increase their solubility in the ion liquid and not as in the present disclosure, using an ion catalyst in the presence of hydrogen, to promote reactions of disintegration and hydrogenation.

U.S. Pat. No. 6,969,693 refers to the use of immobilized ionic liquids in a support as a catalyst in Friedel-Crafts reactions, especially in alkylation reactions, in contrast to the highly dispersed ion liquid catalyst for use in hydro-disintegration and hydrogenation reactions such as the present disclosure.

U.S. Pat. No. 5,731,101 refers to the use of ionic liquids from metal halide salts and hydro halogen alkyl amines for the production of linear alkylbenzene, in contrast to the iron-based ion liquid catalyst of the present disclosure, which is useful for promoting hydrogenation reactions and hydrocracking of heavy hydrocarbon fractions in heavy crude oil for the production of improved crude oils.

U.S. Pat. No. 6,139,723 refers to the use of Fe-based ion liquids for application in bitumen and residue.

U.S. Pat. No. 4,136,013 refers to a catalyst in the form of homogenized suspension of Faith, Ti, Ni and V for the reaction of hydrogenation of crude oil and residues, in contrast to the homogeneous phase catalysts developed in the present disclosure.

U.S. Pat. No. 4,486,293 uses a Fe catalyst in combination with a group VI or group VIII metal from organic salts of these metals for use in coke liquefaction from a hydrogen donor and a saline aqueous solution. The catalyst is first impregnated in coke before the liquefaction reaction, not with the ion liquid catalyst prepared from inorganic iron and molybdenum salts, which are dispersed into crude oil and not impregnated.

U.S. Pat. No. 5,168,088 refers to the use of a slurry-type catalyst for coke liquefaction by precipitation of iron oxide in the coke matrix, rather than from an ion liquid catalyst prepared from inorganic iron and molybdenum salts that are dispersed in crude oil and do not precipitate.

The above technologies were widely exceeded, since the catalyst that is object of the present disclosure is of a bi-functional character, presenting an acidic function, which promotes disintegration reactions, while the metallic function promotes the hydrogenation reaction. Likewise, the homogeneous catalyst is anchored to the rock formation of the reservoir, does not require prior activation and can be used in the oil industry to improve the properties of heavy and extra-heavy crude oils in situ. The severity API is improved from 5-8 units; viscosity is considerably denser, above 99%; the reaction temperature for the treatment of heavy hydrocarbons is 300-490° C. in a time of 0.5 to 4 hours; higher yields to distillates (40-60%) and a lighter product compared to the original crude, also, carbon formation is less than 1% weight.

BRIEF DESCRIPTION OF THE FIGURES OF INVENTION

FIG. 1 illustrates, through a block diagram, the experimental system with rock core.

DESCRIPTION DETAILED OF THE INVENTION

The present disclosure relates to the synthesis and application of a homogeneous phase catalyst, which allows the transformation of heavy and extra-heavy crude oils into lighter oils, by hydro-disintegration and hydrogenation reactions, in a cyclic process either in a reactor belonging to a surface installation or at the bottom of the well, simulating reservoir conditions.

The preparation of the catalyst is carried out in aqueous phase (based on running water, congenital water, and or brine), using inorganic salts of a metal of groups VIIIB, VIB, IB, such as Fe, Co, Ni, Cu, Mo, W. The preparation of the catalyst of the present disclosure includes the following steps:

1. Using conventional vessel, phosphoric acid (H3PO4, technical grade) and ammonium molybding ((NH4)6Mo7O24·4H2O, technical grade) are mixed, stirring moderately at 25° C. until a clear solution is obtained. The pH of the solution varies between 1 and 2.
2. In the second step, the nickel sulfate hexahydrate (NiSO4·6H2O technical grade) is incorporated and solubilized at 40-100° C., preferably 60-90° C., dissolving in running water, keeping the agitation constant for three hours at 25° C.
3. The solution formed above is stored in a closed container under environmental conditions, where the catalytic solution must be green and translucent.
4. Finally, the catalyst is dehydrated at 90° C., depending on the type of application to which it will be directed (liquid phase, gel or particles of the corresponding salts). The final molar ratio is 1.0 nickel:0.084 molybdenum:0.295 H+:14.42 H2O at pH 1-3.

The catalyst of the present disclosure, presents high catalytic activity for hydrocracking reactions and hydrogenation of heavy hydrocarbons. The procedures used during its application allow the physical and chemical properties of the hydrocarbon to be improved, decreasing its kinematic viscosity, which allows its fluidization in pipes. It increases the gravity API, changing the composition by hydrocarbon families, (SARA), increasing the proportion of saturated and aromatic, while decreasing fractions of resins and asphalts. Likewise, the sulphur and nitrogen content is reduced, resulting in higher yields to distillates of high commercial value, e.g. gasoline, diesel and diesel, mainly reaction products are not carbon-formed and therefore the liquid yield is very high, greater than 95%.

The evaluations were carried out according to the scheme in FIG. 1 under operating conditions that prevent the generation of coal, optimizing the performance of liquid products. To do this the operation interval is as follows, shown in Table 1:

TABLE 1

Operating Conditions

| Presssure Kg/cm$^2$ | 70-120 |
|---|---|
| Temperature: | 340-420° C. |
| Reaction time: | 0.5-4 h |
| Catalyst Concentration: | 0.5 10% w |

Results are observed indicating a possible breakdown of asphalt molecules and resins, as well as the removal of sulfur and nitrogen compounds, with an increase in API gravity and a significant decrease in their viscosity.

In order to show unsampled catalyst reference parameters, the conversion of heavy crude oil with a prototype liquid catalyst formulated based on nickel was evaluated. The results are shown in Examples 1 to 4.

The load used for the realization of the different experiments, was a heavy crude of the Golden Strip (North of Veracruz, Mexico), its properties are detailed in Table 2. It was also experimented with rocks representative of a carbonated deposit consisting of dolomites (CaCO3-MgCO3), limestone (CaCO3), magnesites (MgCO3), diatomites (SiO2-H2O) and mixtures thereto; rocks of the site itself and rock of outcrop analogous to the deposit, as well as synthetic rocks of the type Berea (SiO3-Al2O3-MgO—CaO) and limestone Bedford (SiO—MgO—CaO), which are used both in crushed form to different meshes and/or nuclei with different dimensions.

Example 1

The homogeneous Ni-based catalyst was prepared by the aqueous impregnation method. In this method, the required amount of ammonium heptamolibdate [(NH4)6Mo7O24·4H2O], nickel nitrate [Ni (NO3)2·6H2O], and phosphoric acid [H3PO4], in stochiometric proportions at room temperature and at pH between 2 and 3, with constant agitation, is dissolved.

In a batch reactor with a capacity of 500 mL, 200 g of heavy crude oil and 2.5 g of liquid catalyst made from nickel, with mechanical agitation at 800 rpm, were placed. The ambient temperature is increased to 350° C. at a speed of 5° C./min. Hydrogen is then fed, reaching the pressure of 100 Kg/cm2 in the system. Once the above conditions are stabilized, the reaction time was one hour, starting the cooling of the reactor, and recovering the hydrotreated crude.

Example 2

In a batch reactor with a capacity of 500 mL, 200 g of heavy crude oil and 2.0 g of liquid catalyst made from nickel, with mechanical agitation at 800 rpm, were placed. The ambient temperature is increased to 380° C. at a speed of 5° C./min. Hydrogen is fed, reaching the pressure of 100 Kg/cm2 in the system, and once the above conditions stabilized, the reaction time was one hour, starting the cooling of the reactor, and recovering the hydrotreated crude.

Example 3

Taking advantage of the porous volume of the rock and its ability to store fluids such as crude oil, gas and brine, the raw oil is saturated with hydrogen in the presence of a catalyst that is anchored to the rock, at a concentration of 2.0% weight. A stainless steel cell, a continuous injection pump for high pressure, with automatic control, and a reverse pressure regulator are required. The cylinders containing the oil are used to perform the injection process, at a controlled speed and pressure, until the oil saturation defined for the test conditions is reached. A core (1.5×2.5") is placed inside a cell, confinement pressure is applied, vacuumed for a period of one hour and the oil containing catalyst is injected, (same as anchoring to the rock formation is slowly added the necessary amount of crude-catalyst until the desired oil saturation is reached. The ambient temperature is increased to 350° C. at a speed of 30° C./min. Hydrogen is fed, reaching the pressure of 100 Kg/cm2 in the system. Once the previous conditions have been stabilized the reaction time was one hour, the cooling of the reactor starts and the hydrotreated crude is recovered.

Example 4

Taking advantage of the porous volume of the rock and the storage capacity of fluids such as crude, gas and brine, the saturation of the crude oil containing catalyst is performed first. At this stage a stainless steel cell, a continuous injection pump for high pressure, with automatic control, and a reverse pressure regulator are used. The cylinders containing the oil are used for the injection process, at a controlled and pressure speed, until the oil saturation defined for the test conditions is reached. A core of (1.5×2.5") of carbonate formed by dolomites (CaCO3-MgCO3), placed inside a cell, then a confinement pressure is applied and vacuumed for a period of one hour and the oil containing catalyst that is anchored to the rock is injected, slowly adding the necessary amount of that fluid (crude-catalyst), until the desired oil saturation is reached. The ambient temperature is increased to 370° C. at a speed of 30° C./min. Hydrogen is fed, reaching the pressure of 100 Kg/cm2 in the system. Once stabilized the above conditions is left a reaction time of one hour, starting the cooling of the reactor and recovering the hydrotreated crude. Examples 3 and 4 are illustrated in Table 3.

TABLE 2

Load properties and batch reactor products, examples 1 and 2

| Properties | | Heavy Crudes | Example 1 | Example 2 |
|---|---|---|---|---|
| Temperature, ° C. | | | 350 | 380 |
| Pressure kg/cm$^2$ | | | 100 | 100 |
| Gravity °API | | 10.7 | 17 | 18 |
| Viscosity, cSt | 15.75 ° C. | 13,490 | 135.8 | 125.7 |
| | 25.0 ° C. | 4,883 | 90 | 69 |
| | 37.5 ° C. | 3979 | 55.6 | 40 |
| Sulfur total, ppm | | 5.3 | 3.71 | 3.58 |
| Nitrogen total, ppm | | 4994 | 425 | 411 |
| Carbon, ppm | | — | 0.5 | 1.0 |
| SARA, % wt | Saturated | 16 | 28.9 | 31.9 |
| | Resins | 36 | 12.6 | 10.9 |
| | Aromatics | 25 | 44.7 | 46.9 |
| | Asphaltenes | 22 | 13.7 | 10.3 |
| SimDis | | | | |
| TIE | | 73 | 66 | 62 |
| 5.0/10.0 | | 154/219 | 156/196 | 172/241 |
| 15/20 | | 269/310 | 223/248 | 251/277 |
| 25/30 | | 347/382 | 270/290 | 306/347 |
| 35/40 | | 415/445 | 309/326 | 387/401 |
| 45/50 | | 477/506 | 345/364 | 426/452 |
| 55/60 | | 530/550 | 383/403 | 481/511 |

TABLE 2-continued

Load properties and batch reactor products, examples 1 and 2

| Properties | Heavy Crudes | Example 1 | Example 2 |
|---|---|---|---|
| 65/70 | 569/591 | 425/451 | 536/557 |
| 75/80 | 614/680 | 487/529 | 579/604 |
| 90/95 | 691/518 | 614/655 | 652/669 |
| TFE | 744 | 731 | 735 |

Gasoline: TIE-221;
Diesel: 221-343;
Heavy diesel: 343-540;
Resids: 540+
(TIE: Initial boiling temperature; TFE: Final boiling temperature).

TABLE 3

Loading properties and products in a rock core, examples 3 and 4

| Properties | | Heavy Crude | Example 3 | Example 4 |
|---|---|---|---|---|
| Temperature, ° C. | | | 350 | 380 |
| Pressure kg/cm$^2$ | | | 100 | 100 |
| Gravity °API | | 12.5 | 17 | 18 |
| Viscosity, cSt | 15.75 C. | 13,490 | 135.8 | 125.7 |
| | 25.0 C. | 4,883 | 90 | 39 |
| | 37.5 C. | 1,550 | 55.6 | 24 |
| Sulfur total, ppm | | 5.56 | 3.71 | 3.2 |
| Nitrogen total, ppm | | 4494 | 425 | 1699 |
| Carbon, ppm | | | 1.0 | 1.2 |
| SARA, % wt | Saturated | 16 | 28.9 | 30.4 |
| | Resins | 36 | 12.6 | 10.9 |
| | Aromatics | 25 | 45.7 | 37.4 |
| | Asphaltenes | 26 | 12.7 | 9.4 |
| SimDis | | | | |
| TIE | | 73 | 32.8 | 78 |
| 5.0/10.0 | | 154/219 | 106.5/115.4 | 124/151 |
| 15/20 | | 269/310 | 138.2/157.1 | 165/179 |
| 25/30 | | 347/382 | 171/190 | 192/205 |
| 35/40 | | 415/445 | 201/216 | 219/232 |
| 45/50 | | 477/506 | 229/244 | 245/259 |
| 55/60 | | 530/550 | 259/274 | 272/286 |
| 65/70 | | 569/591 | 291/309 | 300/314 |
| 75/80 | | 614/680 | 332/351 | 330/350 |
| 90/95 | | 691/518 | 415/483 | 405/457 |
| TFE | | 744 | 503 | 608 |

Gasoline: TIE-221;
Diesel: 221-343;
Heavy diesel: 343-540;
Waste: 540+
(TIE: Initial boiling temperature; TFE: Final boiling temperature)

Example 5

5 g of liquid catalyst formulated with nickel is impregnated in 250 g of ground rock of magnesites (MgCO3) and diatomites (SiO2-H2O) in mesh 40, the stirring is constant for 2 hours to achieve its perfect homogenization, and is left to rest for 4 hours. Subsequently, the crude oil was saturated at 24% (heavy crude). The continuous flow reactor is loaded with 325 g of the mixture of fluid composed of heavy crude oil-ground rock-catalyst, compacting it in the reactor evenly, then pressing the reactor with nitrogen to verify its watertightness, after 30 minutes the nitrogen is replaced by hydrogen at 100 Kg/cm2. Heating starts at a speed of 20° C./min, to reach the temperature from the ambient to 380° C. Once the temperature has reached the reaction after two hours, then the reactor is cooled to the ambient temperature. The amount of crude oil in the separator is quantified to determine the index of conversion and physicochemical properties.

Example 6

5 g of a liquid catalyst formulated with nickel in 250 g are impregnated with ground rock of outcrop analogous to the carbonated deposit with mesh 40, then left to rest for 4 hours. Then the saturation of the rock core was performed with crude 24% (heavy crude). This impregnated core is loaded into a continuous flow reactor; 325 g of the mixture of heavy crude-ground rock-catalyst, are compacted in the reactor evenly, the reactor is pressed with nitrogen to verify its tightness, and after 30 min the nitrogen is replaced by hydrogen at 100 Kg/cm$^2$. Heating starts at a speed of 20° C./min, to reach the temperature from the environment up to 350° C. Once the temperature is reached, the reaction takes place for two hours, then the reactor cools to room temperature to start recovery. The recovered product is quantified for the amount of crude in the separator to determine the recovery rate and physical and chemical analyses are performed.

TABLE 4

Loadig properties and reaction products in the porous medium (ground rock)

| Properties | Crude | Example 5 | Example 6 |
|---|---|---|---|
| Temperature, ° C. | — | 380 | 350 |
| Pressure kg/cm2 | — | 100 | 100 |
| Gravity °API | 12.5 | 17 | 18 |
| Recovery, % | — | 80 | 65 |
| SimDis | | | |
| TIE | 73 | 59 | 70 |
| 5.0/10 | 154/219 | 180/237 | 170/222 |
| 15/20 | 269/310 | 281/317 | 263/298 |
| 25/30 | 347/382 | 350/387 | 329/359 |
| 35/40 | 415/445 | 414/442 | 390/419 |
| 45/50 | 477/506 | 473/500 | 448/480 |
| 55/60 | 530/550 | 524/543 | 507/530 |
| +65/70 | 569/591 | 560/578 | 547/565 |
| 75/80 | 614/680 | 600/619 | 586/607 |
| 90/95 | 691/518 | 665/693 | 657/686 |
| TFE | 744 | 716 | 715 |

Gasoline: TIE-221;
Diesel: 221-343;
Heavy diesel: 343-540;
Waste: 540+
(TIE: Initial boiling temperature; TFE: Final boiling temperature)

Example 7

The homogeneous catalyst made from Ni in congenital water, was supported in gamma alumina (ABET s 225 m2/g, Pore volume s 0.40 cm3/g, average pore radius x 3.2 nm, particle size 0.20-0.32 mm). In a batch reactor with a capacity of 500 mL, 200 g of heavy crude and 2.5 g of liquid catalyst were placed, the ambient temperature is increased up to 380° C. at a speed of 5° C./min. Subsequently, hydrogen is fed, reaching the pressure of 100 Kg/cm2 in the system. Once the previous conditions are stabilized, the reaction time was one hour, the cooling of the reactor starts, and the hydrotreated.

Example 8

The homogeneous catalyst made from Ni in congenital water, was supported in mesoporous material (ABET s 1200 m2/g, Pore volume 0.42 cm3/g, average pore diameter s 2 nm, particle size 0.3 mm). In a batch reactor with a capacity of 500 mL, 200 g of heavy crude and 2.5 g of liquid catalyst were placed, the ambient temperature is increased up to 380° C. at a speed of 5° C./min. Subsequently, hydrogen is fed, reaching the pressure of 100 Kg/cm2 in the system. Once the previous conditions are stabilized, the reaction time was one hour, the cooling of the reactor starts, and the hydrotreated crude is recovered.

TABLE 5

Load properties and catalyst reaction products supported in alumina and mesoporous material

| Properties | Residue | Example 7 | Example 8 |
|---|---|---|---|
| Temperature, ° C. | — | 380 | 350 |
| Pressure kg/cm$^2$ | — | 100 | 100 |
| Gravity API 15.5° C. | 4.0 | 12 | 10 |
| Viscosity, cSt | 322900 | 270 | 545 |
|  |  | 3.26 | 4.42 |
| Sulfur total, ppm |  5.64 | 381 | 478 |
| Nitrogen total, ppm | 760 |  |  |
| SimDis |  |  |  |
| TIE | 117 | 90 | 97 |
| 5.0/10 | 194/229 | 190/216 | 211/224 |
| 15/20 | 269/310 | 245/320 | 249/342 |
| 25/30 | 351/387 | 340/367 | 363/378 |
| 35/40 | 415/445 | 387/407 | 402/420 |
| 45/50 | 477/506 | 426/446 | 439/460 |
| 55/60 | 530/550 | 469/490 | 481/501 |
| 65/70 | 569/591 | 511/533 | 522/542 |
| 75/80 | 619/670 | 556/571 | 563/589 |
| 90/95 | 687/698 | 630/669 | 641/670 |
| TFE | 744 | 713 | 715 |

Gasoline: TIE-221;
Diesel: 221-343;
Heavy diesel: 343-540;
Residue: 540+
(TIE: Initial boiling temperature; TFE: Final boiling temperature)

The invention claimed is:

1. A homogenous catalyst in aqueous solution to transform heavy and extra-heavy crude oils into lighter oils, wherein the catalyst has a final molar ratio of 1.0 Ni, 0.084 Mo, 0.295 H+, 14.42 H2O, at pH 1 to 3.

2. The catalyst of claim 1, wherein preparation of the catalyst comprises:
    1) mixing a mineral acid and an ammonium molybdate salt, and shaking the mixture at a temperature of 25° C. until a clear solution is obtained, with a pH variation between 1 and 2; and
    2) incorporating a nickel salt into the clear solution and solubilize at 40-100° C., then dissolving in water, and maintaining agitation of the solution for a time of 3 h at a temperature of 25° C.;
    wherein, the resulting catalyst has a final molar ratio of 1.0 Ni, 0.084 Mo, 0.295 H+, 14.42 H$_2$O, at pH 1 to 3 in a green and translucent solution.

3. The catalyst of claim 2, wherein the water used during preparation can be selected from running water, congenital water, brine, and a mixture thereof.

4. The catalyst of claim 2, further comprising preparing the catalyst in a liquid phase, or a gel phase.

5. The catalyst of claim 2, further comprising preparing the catalyst in a solid phase by dehydrating the green and translucent solution at 90° C.

6. The catalyst of claim 2, further comprising preparing the catalyst in a supported form.

7. The catalyst of claim 6, wherein the catalyst in the supported form presents a specific BET specific area between about 30 and about 1250 m$^2$/g.

8. The catalyst of claim 7, wherein the support for the catalyst in the supported form is selected from a group consisting of $SiO_2$, $TiO_2$, $ZrO_2$, $Al_2O_3$, SBA's, and MCM's.

9. The catalyst of claim 8, wherein the catalyst is anchored to a rock formation.

10. The catalyst of claim 9, wherein the rock formation comprises rocks selected from a group consisting of dolomites, limestones, magnesites, diatomites, and mixtures thereof, rocks of carbonated deposit, and synthetic rocks of Berea or Bedford limestone.

11. The catalyst of claim 10, wherein the catalyst is injected directly into the injector well of a reservoir of the rock formation.

12. The catalyst of claim 11, wherein the rock formation further comprises a carbonated deposit at a variable ratio of 1 to 10% weight with respect to hydrocarbon.

13. The catalyst of claim 12, further comprising activation of active metals carried out on-site at the rock formation.

14. The catalyst of claim 13, further comprising a coke generation of only 0.001-0.6% weight.

* * * * *